Aug. 28, 1945.    R. GORDON    2,383,479
WIRE STRIPPING DEVICE
Filed May 5, 1944

INVENTOR.
Reuben Gordon
BY
ATTORNEY

Patented Aug. 28, 1945

2,383,479

UNITED STATES PATENT OFFICE 2,383,479

WIRE-STRIPPING DEVICE

Reuben Gordon, Jamaica, N. Y.

Application May 5, 1944, Serial No. 534,369

4 Claims. (Cl. 81—9.5)

This invention relates to new and useful improvements in a wire stripping device.

More specifically, the invention proposes the construction of a wire cutter and stripper characterized by having four blades simultaneously movable toward a common point.

Still further it is proposed to provide a wire cutter and stripper having a handle providing spring means for urging the cutting and stripping elements to normal position.

Still further, it is proposed to provide a wire cutter and stripper as aforesaid for cutting or stripping a wire intermediate its ends.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
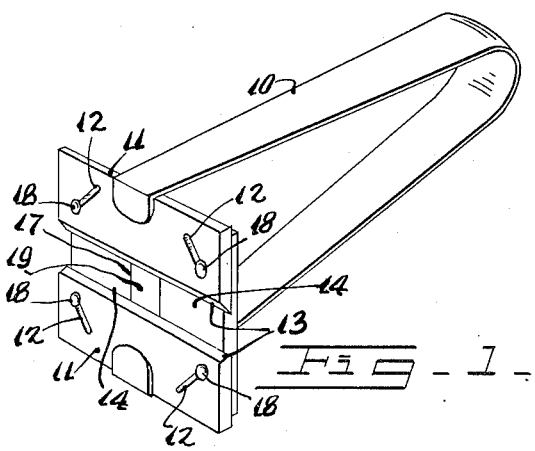
Fig. 1 is a perspective view of a wire stripping device constructed in acordance with this invention.
Figure 4:
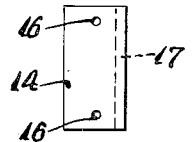
Fig. 4 is a front view of one of the cutting blades of the tool of Fig. 1.
Figure 5:
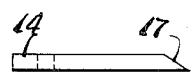
Fig. 5 is a plan view of the blade of Fig. 4.

The wire cutting and stripping tool shown in Figs. 1–5, according to this invention, comprises a U-shaped spring metal handle 10 to the free ends of which are secured, as by welding, two blades 11. If desired, blades 11 may be made integral with the handle 10. Blades 11 are identical but are oppositely disposed and spaced from each other. Each blade 11 has two oblique diverging slots 12 and a cutting edge 13, the cutting edges being opposite to each other.

Two other spaced floating blades 14, at right angles to blades 11, are movably secured to blades 11 by screws 18 threadedly secured to blades 14 having shoulders 15 slidably disposed in slots 12. Each blade 14 has threaded holes 16 for the screws 18 and has a cutting edge 17. Blades 14 are somewhat shorter than blades 11. Each screw 18 has a head wider than the slot 12 it is disposed in so that blades 14 can not become disassembled from blades 11.

The spring handle 10 is energized and the slots 12 are directed as shown in Fig. 1, so that the handle 10 normally holds the rivets at the inner ends of the slots with the blades 11 and 14 disposed at their full extreme positions away from each other, providing a rectangular opening 19.

Referring to Fig. 1 it will be seen that the cutting edges 13 face forwardly whereas the cutting edges 17 face rearwardly. However, if desired, the cutting edges can all face in the same direction, that is, all forwardly or all rearwardly.

The operation of this form of the device is as follows:

An insulated wire 20, the end of which it is desired to bare, so that an electrical connection can be made, is disposed with its end to be bared in opening 19. Handle 10 is then squeezed so that the cutting edges bite into the insulation at 21. The tool can then be turned so that a cut is completed entirely around the insulation. The user of the tool will only squeeze the handle 10 sufficiently to pierce the insulation and not to cut the wire. However, the tool can also be employed to cut the wire if desired, as the slots 12 are made long enough for the cutting edges 13 to come together and for the cutting edges 17 to come together, thus completely eliminating the opening 19.

Figure 2:
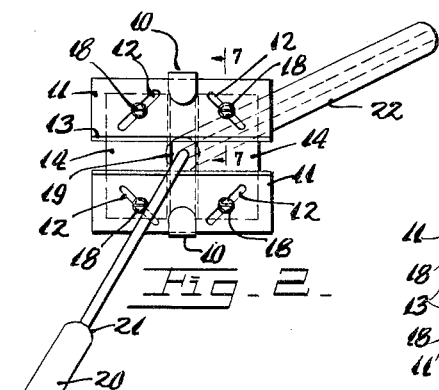
Fig. 2 is a front elevational view of Fig. 1 showing a piece of insulated wire partly stripped.
Figure 3:
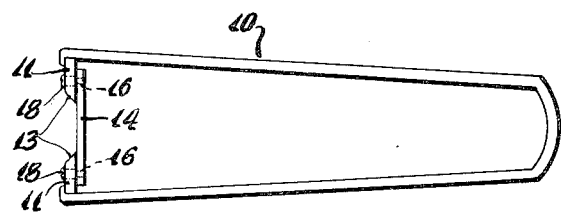
Fig. 3 is a side view of the stripping tool of Fig. 1.

In stripping the wire, after the insulation has been cut through, the user of the tool holds the wire in one hand and pulls the tool with the other hand, still keeping the handle squeezed. In some cases it will be possible to pull off the insulation in one piece 22 as shown in Fig. 2. In other cases the tool can be used by continually pulling it back and forth to scrape the insulation off. In a similar manner the tool may be used to scrape the wire so that a bright, clean surface is obtained, affording a good electrical connection.

The tool may be made to accommodate a range of wires of different sizes. No matter how large the opening 19 is to start with, as the blades may come together until they completely eliminate opening 19, even the smallest wire may be stripped.

If desired the slots can be made of such length that the blades will not come completely together. For instance, they may be stopped by the screws engaging the outer ends of the slots, leaving opening 19 about one sixteenth of an inch in width. In such case the tool will be only a stripper and not a cutter. This type of tool may be employed where it is desired to have a tool which can not accidently cut the wire. This type of tool for stripping only is particularly adapted for use with wire made of many strands where the danger of accidentally cutting one of the strands is great.

Figure 6:
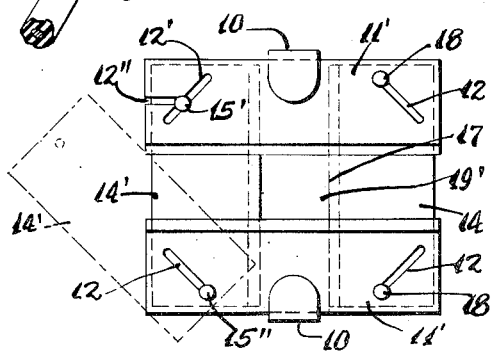
Fig. 6 is an enlarged view, similar to Fig. 2 of a wire cutter and stripper constructed in accordance with a modification of this invention, one blade being indicated in a dot and dash lines in one position assumed in the operation of the tool.
Figure 7:
Fig. 7 is an enlarged sectional view taken on the line 7—7 of Fig. 2.

In the modification of the invention shown in Fig. 6, the construction of the tool is similar to that previously described except that one slot 12' is opened through the side edge of its blade 11' by a portion 12". The adjacent blade 14' can then be swung so that its rivet 15' moves out of slot 12' as indicated in dot and dash lines in Fig. 6, the other rivet 15" of blade 14' acting as a fulcrum. Such swinging of blade 14' opens opening 19' through one side of the tool and permits an intermediate part of a wire to be introduced to the opening 19' for stripping. When using the tool for stripping, rivet 15' will be disposed in slot 12' above the portion 12", preventing blade 14' from accidently swinging out of operative position. In other respects the tool of Fig. 6 is like the tool of Figs. 1–5 and no further description thereof is deemed necessary.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A tool for stripping insulation off of wire comprising a U-shaped spring metal handle, a blade connected to each of the free ends of said handle, said blades being spaced, each of said blades having a cutting edge and two oppositely inclined slots, a pin movably disposed in each of said slots, and two spaced blades, each having a cutting edge and bridging said slotted blades at one side thereof and rigidly secured to said pins, said slotted blades being movable toward each other and said other two blades being movable toward each other upon movement of said free ends toward each other.

2. A tool for stripping insulation off wire comprising two parallel spaced blades each having two oppositely directed inclined slots, two other parallel spaced blades at right angles to said slotted blades each having two pins secured thereto, each of said other blades bridging said slotted blades at one side thereof and having its pins disposed in the adjacent slots of said bridged blades, and handle means connected to two of said parallel blades for moving them toward each other and for simultaneously moving the other two parallel blades toward each other whereby said blades are adapted to simultaneously cut into the insulation of said wire.

3. A tool for stripping insulation off of wire comprising a U-shaped spring metal handle, a blade connected to each of the free ends of said handle, said blades being spaced, each of said blades having a bevelled scraping edge and two opposite inclined slots, a pin movably disposed in each of said slots, and two spaced blades each having a bevelled scraping edge and bridging said slotted blades at one side thereof and rigidly secured to said pins, said slotted blade scraping edges being oppositely directed to the scraping edges of said other blades, said slotted blades being movable toward each other and said other blades being movable toward each other upon movement of said free ends toward each other.

4. A tool for stripping insulation off of wire comprising a U-shaped handle of spring metal, a blade connected to each of the free ends of said handle, said blades being spaced, each of said blades having a scraping edge and two inclined oppositely directed slots, one of said blades having a passage opening one of its said slots through an edge of said one of said blades, a pin movably disposed in each of said slots, and two spaced blades each having a cutting edge and bridging said slotted blades at one side thereof and rigidly secured to said pins, said slotted blades being movable toward each other and said other two blades being movable toward each other upon movement of said free ends toward each other, the blade rigidly secured to the pin disposed in said slot opened by said passage being swingable to move said last mentioned pin out of said passage and said slot it opens for permitting insertion of a wire between said blades.

REUBEN GORDON.